M. HOGAN.
Water-Closet.

No. 202,652. Patented April 23, 1878.

Witnesses:
Robt. F. Gaylord
Michael P. Dooly

Inventor:
Matthew Hogan
By W. E. Simonds
Atty

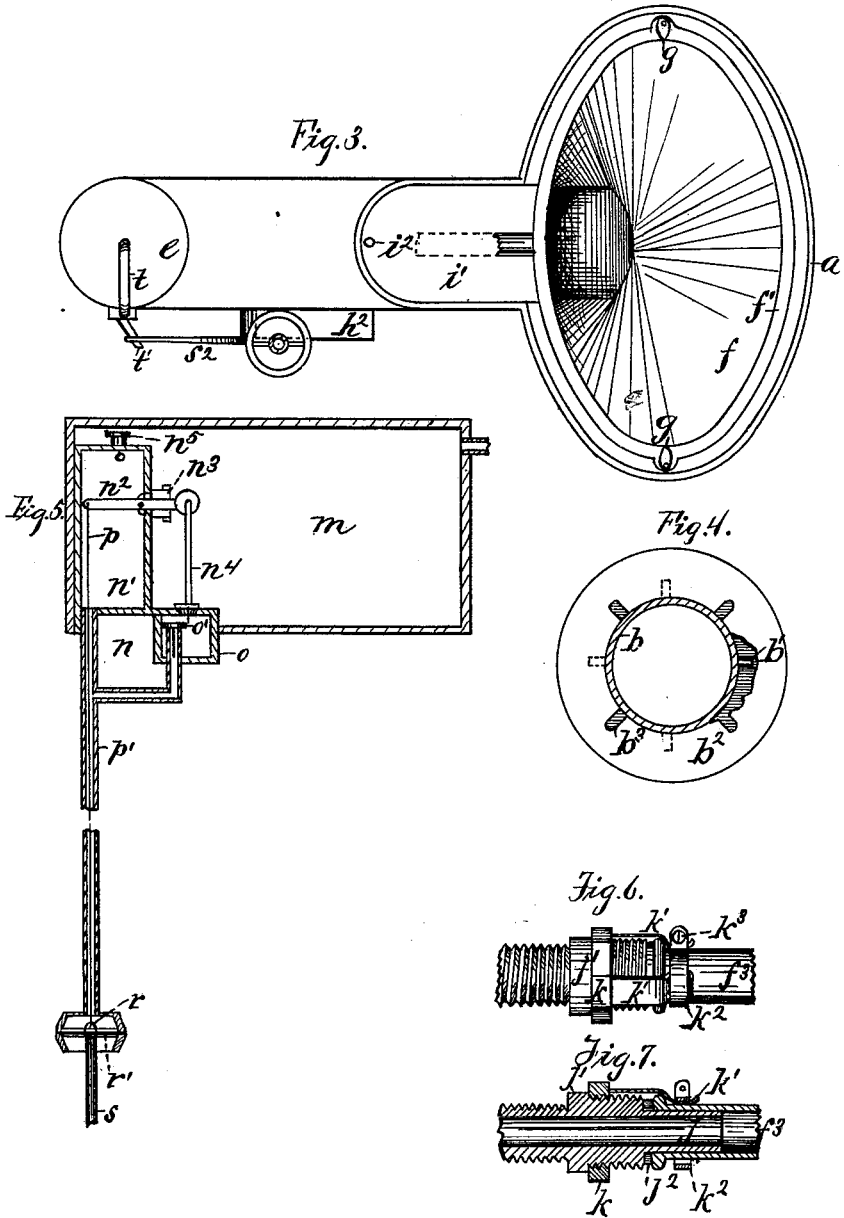

UNITED STATES PATENT OFFICE.

MATTHEW HOGAN, OF HARTFORD, CONNECTICUT.

IMPROVEMENT IN WATER-CLOSETS.

Specification forming part of Letters Patent No. 202,652, dated April 23, 1878; application filed December 24, 1877.

*To all whom it may concern:*

Be it known that I, MATTHEW HOGAN, of Hartford, in the county of Hartford and State of Connecticut, have invented certain new and useful Improvements pertaining to a Water-Closet, of which the following is a specification, reference being had to the accompanying drawings, where—

Figure 1:
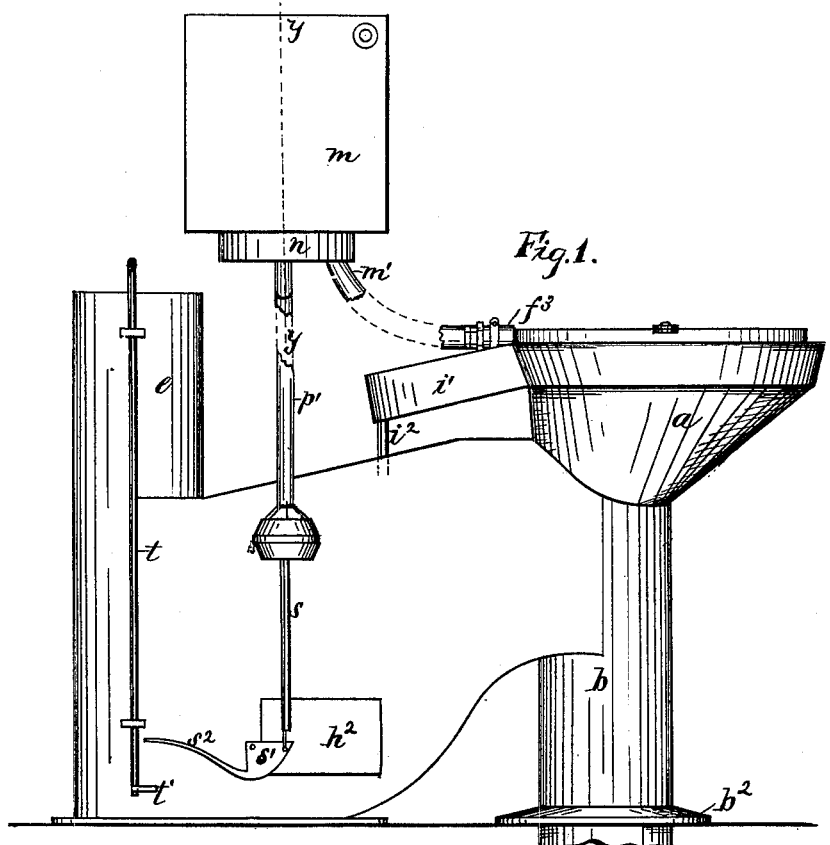
Figure 2:
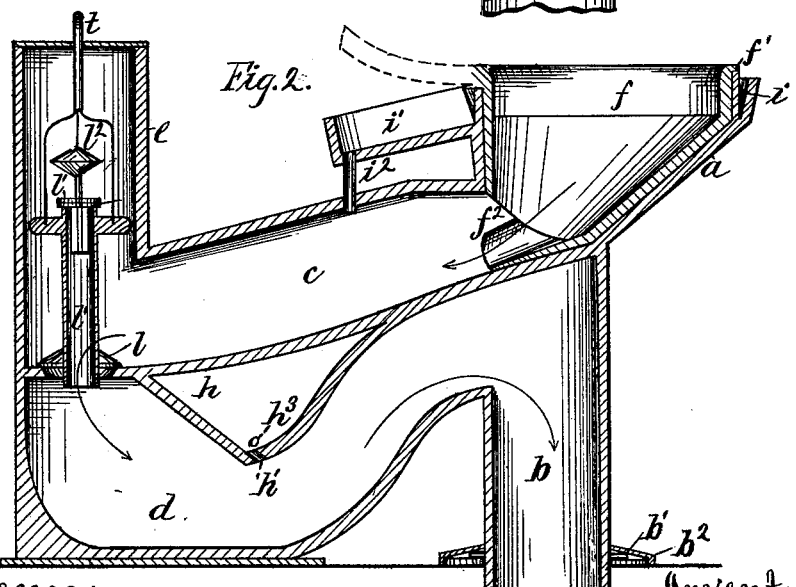

Figure 1 is a side view or elevation. Fig. 2 is a view in central vertical section. Fig. 3 is a top view. Fig. 4 is a view in horizontal cross-section of the delivery-pipe, looking downward. Fig. 5 is a view in vertical section of the overhead-reservoir and of the connection below, between it and the bell-crank lever, hereinafter described, on the plane $y\,y$. Fig. 6 is a side view of the coupling. Fig. 7 is a sectional view of the same.

The casing or body of the closet is, by preference, of one piece of cast-iron, cored out in the molding to give the requisite hollowness. This casing, as a whole, consists of the metallic basin $a$, the delivery-pipe $b$, the water-way $c$, the trap $d$, and the valve-tube $e$. Within the metallic basin $a$ sits the earthen basin $f$, resting by its flanged rim $f^1$ on the edge of the metallic basin, and having a delivery-spout, $f^2$, opening into the water-way $c$. It can be held to place, when such holding is necessary, by the turn-buttons $g$. For a cheap class of closets the earthen basin may be omitted. The water and soil find their way from the basin down the incline of the water-way $c$, through the valve at the lower end, (about which more hereinafter,) into the trap $d$, and out into the delivery-pipe $b$.

It is well known that the water is sometimes siphoned out of water-traps by a sudden rush of water in an adjoining and communicating pipe. This trouble I cure by having a reservoir, $h$, so situated with reference to the trap that when the water in the trap is at its normal height it will flow into this reservoir and partly or wholly fill it. The communication between such trap and reservoir is by a comparatively small orifice, $h^1$. When the sudden rush of water in an adjoining and communicating pipe siphons the water out of the trap the orifice $h^1$ is so small that but a small portion of the water contained in the reservoir has time to escape, and when the sudden rush is over this reservoir replenishes the trap.

When it is desired that this reservoir shall contain a very considerable quantity of water, a chamber, $h^2$, may be located on the side of the casing, and communicate with the reservoir $h$ by an orifice or tube, $h^3$.

The methods of fastening water-closet casings to the floor are defective. I have made an improvement in this regard. I furnish the delivery-pipe $b$ with studs or pins $b^1$, preferably three in number, and provide a collar, $b^2$, which will just slip on the pipe, provided with slots $b^3$, corresponding in number and position with the pins $b^1$, which allow the collar to be slipped past the pins; then, by a partial rotation, it is locked upon the pipe. The collar can then be fastened to a floor, and will hold the delivery-pipe down securely without pulling it from its proper position.

I have made an improvement in the matter of a slop-trough around the top of the metallic basin. The letter $i$ denotes such a slop-trough, with a let-off, $i^1$, on one side, from which a waste-pipe, $i^2$, leads away to some proper place.

I have made an improvement in couplings specially applicable for connecting a metallic supply-pipe to the earthen nozzle or pipe $f^3$. The letters $j\ j^1$ denote a coupling-half. The letter $j$ denotes the plain pipe part, fitting within the pipe $f^3$. The letter $j^1$ denotes the threaded part, raised from the pipe part $j$ by a shoulder, against which rests the rubber or other washer $j^2$. The letter $k$ denotes the other coupling-half, internally threaded to screw upon the thread $j^1$. From it spring-fingers $k^1$ run upon the outside of the nozzle $f^3$. Around these spring-fingers runs the spring-band $k^2$, which may be contracted, so as to tighten the hold of the spring-fingers $k^1$ upon the pipe $f^3$, by means of the screw $k^3$. The letter $l$ denotes the valve, which is raised to allow the water and soil to pass from the water-way $c$ into the trap $d$. It is extended upward into a pipe, and has a central opening, $l^1$, through it. On the top of this opening rests the valve $l^1$, provided above with the float $l^2$. When, from leakage or other abnormal cause, the water unduly rises in the water-way, it raises the float $l^2$, opening the valve $l^1$, and permitting the surplus water to escape into the trap below.

I will now describe the supply-reservoir, which may be located overhead, or in any other convenient locality above the closet. The letter $m$ denotes such reservoir, and $m'$ the supply-pipe leading from it to the basin or bowl. The letter $n$ denotes a plug filling a corresponding opening into the reservoir $m$, it preferably being screwed into the opening. On top of this plug is fixed a chamber, $n^1$. In this chamber is pivoted the lever $n^2$, operated by a wire coming from below, hereinafter described. The lever runs through the wall of chamber $n^1$, the point of passage being stopped from leakage by the rubber or other packing $n^3$. From the outer end of this lever depends the valve $n^4$, opening into the chamber $o$, also fixed to the plug $n$. When said wire is pulled down, the valve $n^4$ is lifted and water let into the chamber $o$, whence it flows through the supply-pipe $m'$ to the basin or bowl. The letter $n^5$ denotes a vent-valve to admit air to reservoir $m$ when water is let out therefrom, and $o^1$ a similar vent-valve for chamber $o$. The wire $p$ runs down through pipe $p'$, to take hold of the loop $r$ attached to the rubber diaphragm $r'$, from which a rod, $s$, runs down to the bell-crank lever $s^1$, from the opposite end of which extends the arm $s^2$. When the valve-rod $t$ is raised, (thus permitting soil and water to pass from water-way $c$ into trap $d$,) the finger $t'$ attached to said valve-rod comes up against the arm $s^2$ and raises it, pulling down on the wire $p$ and letting water flow from the overhead-reservoir to the basin. The valve overhead is weighted to pull the wire back and up again. An afterwash is effected by having the valve $o^1$ much smaller than the pipe $m'$.

I claim as my invention—

1. The metallic casing provided with the basin $a$ and water-way $c$, in combination with the earthen basin $f$, provided with the delivery-spout $f^2$, opening into said water-way.

2. In combination with the trap $d$, the reservoir $h$ and the proportionately small communicating orifice $h^1$.

3. In combination, the delivery-pipe $b$, provided with the pins $b^1$, and the loose collar $b^2$, provided with the slots $b^3$.

4. In combination, the flanged nozzle $f^3$, the coupling-half $jj^1$, the coupling-half $k$, provided with the fingers $k^1$, and the band $k^2$.

5. In combination, the water-way $c$, the trap $d$, the hollow valve $l$, and the valve $l^1$, provided with the float $l^2$.

6. In combination, the reservoir $m$, the plug $n$, with chambers $n^1$ $o$ attached thereto, the lever $n^2$, and the valve $n^4$.

7. In combination, the pull-wire $p'$, diaphragm $t'$, rod $s$, and the overhead lever and valve.

MATTHEW HOGAN.

Witnesses:
ROBT. F. GAYLORD,
W. E. SIMONDS.